US009383000B2

(12) United States Patent
Tippelhofer et al.

(10) Patent No.: US 9,383,000 B2
(45) Date of Patent: Jul. 5, 2016

(54) GEARSHIFT KNOB AND METHOD FOR OPERATING A VEHICLE

(75) Inventors: Mario Tippelhofer, San Mateo, CA (US); Jaime Camhi, Sunnyvale, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 67 days.

(21) Appl. No.: 13/294,774

(22) Filed: Nov. 11, 2011

(65) Prior Publication Data

US 2013/0120129 A1 May 16, 2013

(51) Int. Cl.
*B60Q 1/00* (2006.01)
*F16H 59/02* (2006.01)
*B60Q 3/02* (2006.01)
*F16H 61/24* (2006.01)

(52) U.S. Cl.
CPC ............ *F16H 59/0278* (2013.01); *B60Q 3/024* (2013.01); *F16H 59/0217* (2013.01); *F16H 2059/0221* (2013.01); *F16H 2061/241* (2013.01)

(58) Field of Classification Search
CPC . F16H 61/02; F16H 61/0202; F16H 61/0204; F16H 61/0213; F16H 61/0246; F16H 61/0248; F16H 61/241; F16H 59/0217; F16H 2059/0221; F16H 59/0278; B60Q 3/024
USPC ................. 701/64, 95, 123, 51; 340/438, 456
See application file for complete search history.

(56) References Cited

U.S. PATENT DOCUMENTS

| | | | | |
|---|---|---|---|---|
| 4,174,766 A * | 11/1979 | Kalogerson | ............ | B60K 35/00 180/313 |
| 4,267,545 A * | 5/1981 | Drone | ...................... | F16H 63/42 340/439 |
| 4,355,296 A * | 10/1982 | Drone | ................. | B60R 16/0236 340/439 |
| 4,438,423 A * | 3/1984 | Stier | ....................... | F16H 63/42 200/61.88 |
| 4,853,673 A * | 8/1989 | Kido | ................... | B60R 16/0236 340/439 |
| 6,137,399 A * | 10/2000 | Westberg | .................. | G01P 1/08 324/160 |
| 6,246,127 B1 | 6/2001 | Weilbacher et al. | | |
| 7,104,152 B2 * | 9/2006 | Levin | ..................... | F16H 59/044 200/61.88 |
| 7,447,584 B2 * | 11/2008 | McMullen | ............ | B60W 50/14 340/439 |
| 7,482,912 B2 * | 1/2009 | Ruttiger | .................. | F16H 63/42 340/439 |
| 7,540,213 B2 * | 6/2009 | Kerber | ................ | F16H 59/0217 200/61.88 |
| 7,684,919 B2 * | 3/2010 | AbuSamra | ........ | B60W 30/1882 477/115 |
| 7,847,680 B2 | 12/2010 | Gencyuz et al. | | |

(Continued)

FOREIGN PATENT DOCUMENTS

DE  102006002755 A1  7/2007
DE  102008025118 A1  12/2009

*Primary Examiner* — An T Nguyen
(74) *Attorney, Agent, or Firm* — Barnes & Thornburg LLP (57) ABSTRACT

A gearshift knob for a gearshift lever of a vehicle and a method for operating a vehicle are described.

16 Claims, 5 Drawing Sheets

(56) References Cited

U.S. PATENT DOCUMENTS

| | | | | |
|---|---|---|---|---|
| 8,185,170 B2 * | 5/2012 | Itoh | G06F 1/1616 | 455/566 |
| 8,255,133 B2 * | 8/2012 | Ahn | F16H 61/12 | 340/441 |
| 8,407,623 B2 * | 3/2013 | Kerr | G06F 3/04883 | 715/840 |
| 8,452,498 B2 * | 5/2013 | Flanagan | F16H 61/24 | 200/61.88 |
| 8,581,718 B2 * | 11/2013 | Muller | B60K 35/00 | 340/3.71 |
| 8,587,423 B2 * | 11/2013 | Olsen | F16H 63/42 | 340/438 |
| 8,699,995 B2 * | 4/2014 | Ellis | G06F 3/04883 | 455/410 |
| 2003/0188594 A1 * | 10/2003 | Levin | F16H 59/044 | 74/473.12 |
| 2005/0054443 A1 * | 3/2005 | Miyakawa | G05G 9/04 | 463/36 |
| 2006/0047386 A1 * | 3/2006 | Kanevsky | B60K 35/00 | 701/36 |
| 2007/0179694 A1 * | 8/2007 | McMullen | B60W 50/14 | 701/51 |
| 2008/0070197 A1 * | 3/2008 | Yu | A63H 33/30 | 434/62 |
| 2008/0211779 A1 * | 9/2008 | Pryor | G01C 21/3664 | 345/173 |
| 2009/0248260 A1 * | 10/2009 | Flanagan | F16H 61/24 | 701/51 |
| 2009/0258677 A1 * | 10/2009 | Ellis | G06F 3/04883 | 455/556.1 |
| 2009/0312918 A1 * | 12/2009 | Aubert Sola-Morales | B60K 20/02 | 701/48 |
| 2010/0225773 A1 * | 9/2010 | Lee | H04N 5/232 | 348/222.1 |
| 2010/0300235 A1 | 12/2010 | Hostmann et al. | | |
| 2010/0305819 A1 * | 12/2010 | Pihlajamaki | B60W 50/14 | 701/51 |
| 2010/0312442 A1 * | 12/2010 | Ahn | F16H 63/42 | 701/64 |
| 2011/0025488 A1 * | 2/2011 | Leon | B60K 37/06 | 340/456 |
| 2011/0043468 A1 * | 2/2011 | Lathrop | B60K 37/06 | 345/173 |
| 2011/0138322 A1 * | 6/2011 | Aoki | B60K 35/00 | 715/786 |
| 2013/0038437 A1 * | 2/2013 | Talati | B60K 35/00 | 340/438 |
| 2013/0120129 A1 * | 5/2013 | Tippelhofer | B60Q 3/024 | 340/456 |

* cited by examiner

GEARSHIFT KNOB AND METHOD FOR OPERATING A VEHICLE

BACKGROUND

The disclosed embodiments relate to a gearshift knob for a gearshift lever of a vehicle, a vehicle comprising a gearshift lever with a gearshift knob, and a method for operating a vehicle with a gearshift lever with a gearshift knob.

SUMMARY

According to a disclosed embodiment, a gearshift knob for a gearshift lever of a vehicle is provided. The gearshift knob comprises a display configured to display a variable visual information, and a touch-sensitive surface configured to detect a touch of a user touching the touch-sensitive surface.

According to another disclosed embodiment, a vehicle comprising a gearshift lever with a gearshift knob is provided. The gearshift knob comprises a display configured to display a variable visual information, and a touch-sensitive surface configured to detect a touch of a user touching the touch-sensitive surface.

According to yet another disclosed embodiment, a method for operating a vehicle is provided. The vehicle comprises a gearshift lever with a gearshift knob. The gearshift knob comprises a display configured to display a variable visual information and a touch-sensitive surface configured to detect a touch of a user touching the touch-sensitive surface. According to the method, information of the vehicle or information about the vehicle is displayed on the display of the gearshift knob.

Although specific features described in the above summary and the following detailed description are described in connection with specific disclosed embodiments, it is to be understood that the features of the disclosed embodiments described can be combined with each other unless it is noted otherwise.

BRIEF DESCRIPTION OF THE DRAWINGS

Hereinafter, disclosed embodiments of the invention will be described with reference to the drawings.

DETAILED DESCRIPTION

In the following, disclosed embodiments will be described in detail. It is to be understood that the following description is given only for the purpose of illustrating the principles of the invention and is not to be taken in a limiting sense. Rather, the scope of the disclosure is defined only by the appended claims and not intended to be limited by the exemplary embodiments hereinafter.

It is to be understood that in the following detailed description of the disclosed embodiments, any direct connection or coupling between functional blocks, devices, components or other physical or functional units shown in the drawings or described herein could also be implemented in an indirect connection or coupling. Same reference signs in the various instances of the drawings refer to similar or identical components. It is furthermore to be understood that the features of the various exemplary embodiments described herein may be combined with each other unless specifically noted otherwise.

Since the beginning of automotive history, the gearshifter has been an essential control instrument for vehicles. The purpose of the gearshifter, which is also called gearshift lever, is changing the gears in the transmission of the car. Furthermore, it is not uncommon for drivers to rest their hand on an upper part of the gearshift lever, the so-called gearshift knob, while driving, even in vehicles equipped with an automatic transmission. The gearshift lever is one of the few major control elements in a vehicle cockpit which resides in a similar location among most car models. Its shape and location make it easy to locate and grasp even without looking directly at it. Every driver needs to be familiar with the gearshift lever and its location in order to operate the car correctly. In manual transmission cars the gearshift knob is one of the most touched instruments in the vehicle other than the steering wheel and pedals.

Furthermore, designers and developers of vehicles are always looking for an improvement of input and output devices of a vehicle for operating the vehicle to make operation of the vehicle more intuitive, comfortable, and safer.

According to one disclosed embodiment, a gearshift knob for a gearshift lever of a vehicle comprises a display configured to display a variable visual information and a touch-sensitive surface configured to detect a touch of a user touching the touch-sensitive surface. In most technical and automotive systems, the reaction to a user input is directly coupled with a visual feedback to the user. This feedback should intuitively be given in close proximity to the actuating element in order to ensure motoric correlation between actuation and visualization of results. With the help of an integrated display in the gearshift knob a direct visual feedback as to which gear is currently selected can be provided. This may be especially advantageous in manual transmission cars. A visual feedback about the currently selected gear at the gearshift knob provides direct feedback at the origin of the actuation to verify and ensure the gear selection. This may be of interest for the driver, especially when switching to the reverse gear. Furthermore, the touch-sensitive surface in the gearshift knob provides a further input element for the driver. As the gear selector has always been a fundamental and necessary control element for the mobility of the vehicle and every driver needs to know where the gear selector is located within the vehicle cockpit in order to operate the vehicle, the gearshift knob is an attractive interaction element which may be located by a user without even looking. In manual transmission cars the gear selector is one of the most frequently used instruments which implies that it can be utilized as an input device since the driver is already interacting with the gearshift knob for a significant amount of time in any case. Furthermore, the gearshifter as an input device is an ergonomic input device. The driver's arm can be rested on the armrest of the vehicle while the hand is wrapped around the gearshift knob just like during a regular gear-shifting procedure. When holding the gear selector with the right hand (assuming a left-steering car) the thumb can be used for basic gestures input on the touch-sensitive surface.

Figure 1:
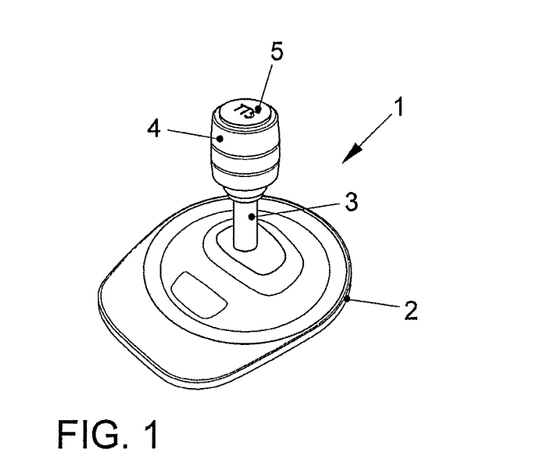
FIG. 1 shows schematically a gearshift lever of a vehicle with a gearshift knob according to one disclosed embodiment.
Figure 2:
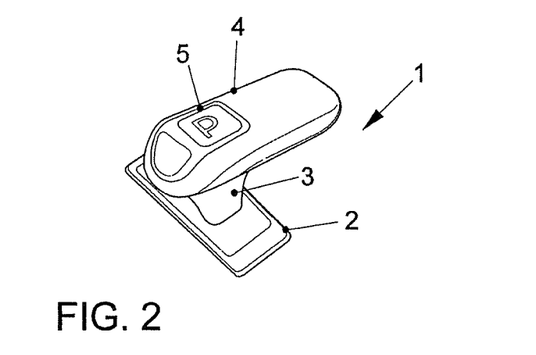
FIG. 2 shows schematically a gearshift knob and a gearshift lever of a vehicle according to another disclosed embodiment.

FIGS. 1 and 2 show exemplary embodiments of a gear selector 1. The gear selector 1 comprises a base 2 at which a lower end of a gearshift lever 3 is moveably mounted. At an upper end of the gearshift lever 3 a gearshift knob 4 is arranged. At an upper side of the gearshift knob 4 a so-called touchscreen 5 is mounted. The touchscreen 5 comprises a display for displaying variable visual information, for example a liquid crystal display, and a touch-sensitive surface configured to detect a touch of a user touching the touch-sensitive surface.

Figure 3:
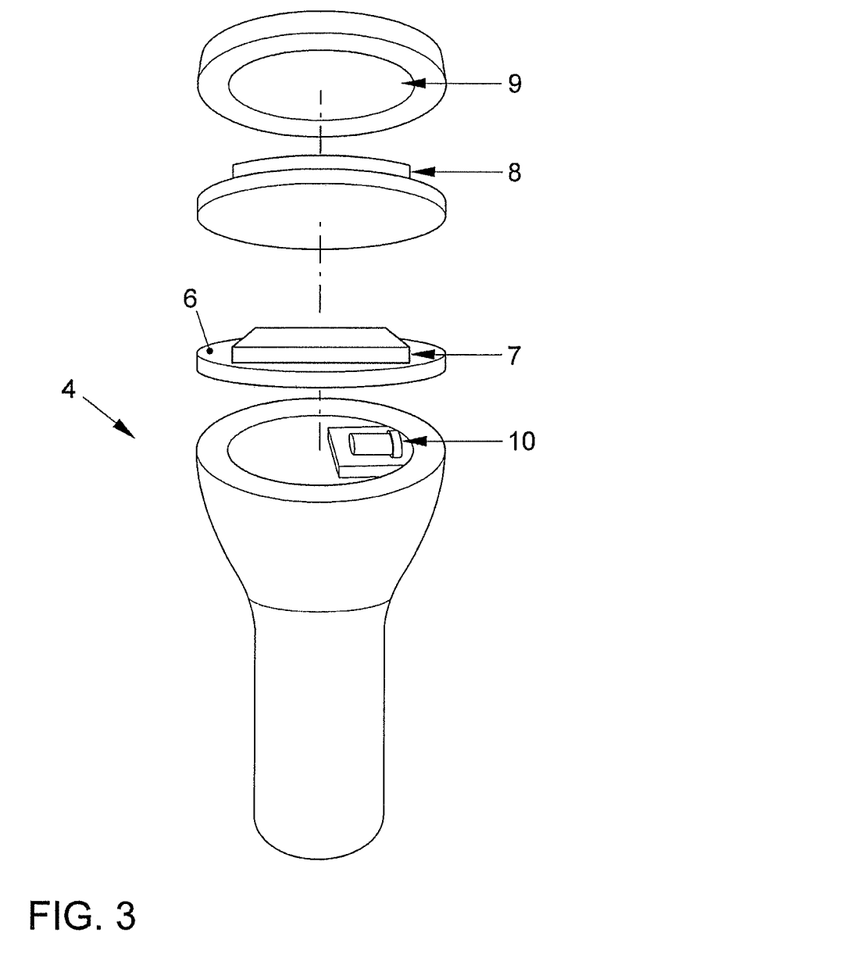
FIG. 3 shows schematically an exploded perspective view of a gearshift knob for a gearshift lever according to a disclosed embodiment.

FIG. 3 shows the structure of the gearshift knob 4 in more detail. At the upper side of the gearshift knob 4 a carrier 6 carrying an electronic control unit 7 is provided. On top of the electronic control unit 7 a display 8 is arranged and on top of the display 8 a touch-sensitive surface 9 is located. The display 8 and the touch-sensitive surface 9 constitute the touchscreen 5. The visual information output by the display 8 is visible through the touch-sensitive surface 9 from a user looking from an upper side at the touch-sensitive surface 9. The electronic control unit 7 controls an output to the display 8 and detects a touch of a user touching the touch-sensitive surface 9. Furthermore, the gearshift knob 4 comprises a haptic feedback device 10, for example a small-scale electric motor with an out-of-balance weight attached at the rotor of the motor. Upon actuation of the motor of the haptic feedback device 10, the gearshift knob 4 starts to vibrate and this vibration may be recognized by a user touching the gearshift knob 4 or the touch-sensitive surface 9.

When holding the gear selector 1 at the gearshift knob 4 with for example a right hand of the driver (assuming a left-steering car), the thumb may be used to input gestures via the touchscreen 5.

Figure 4:
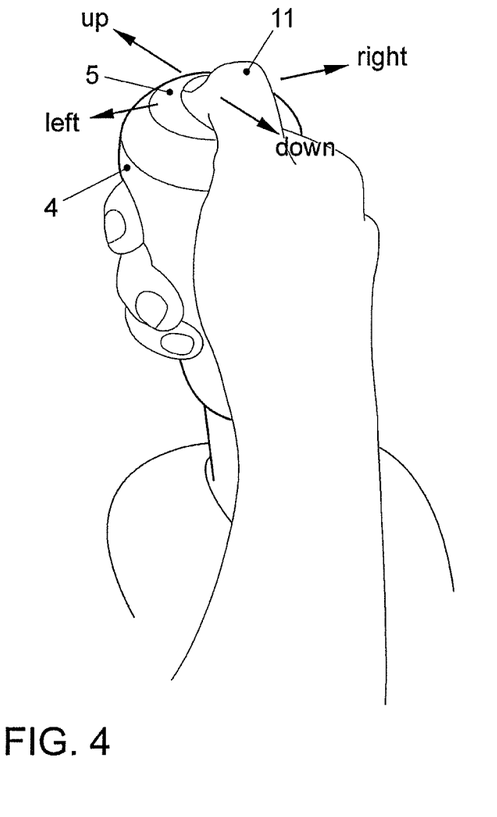
FIG. 4 shows schematically a user operating a gearshift knob according to a disclosed embodiment.
Figure 5:
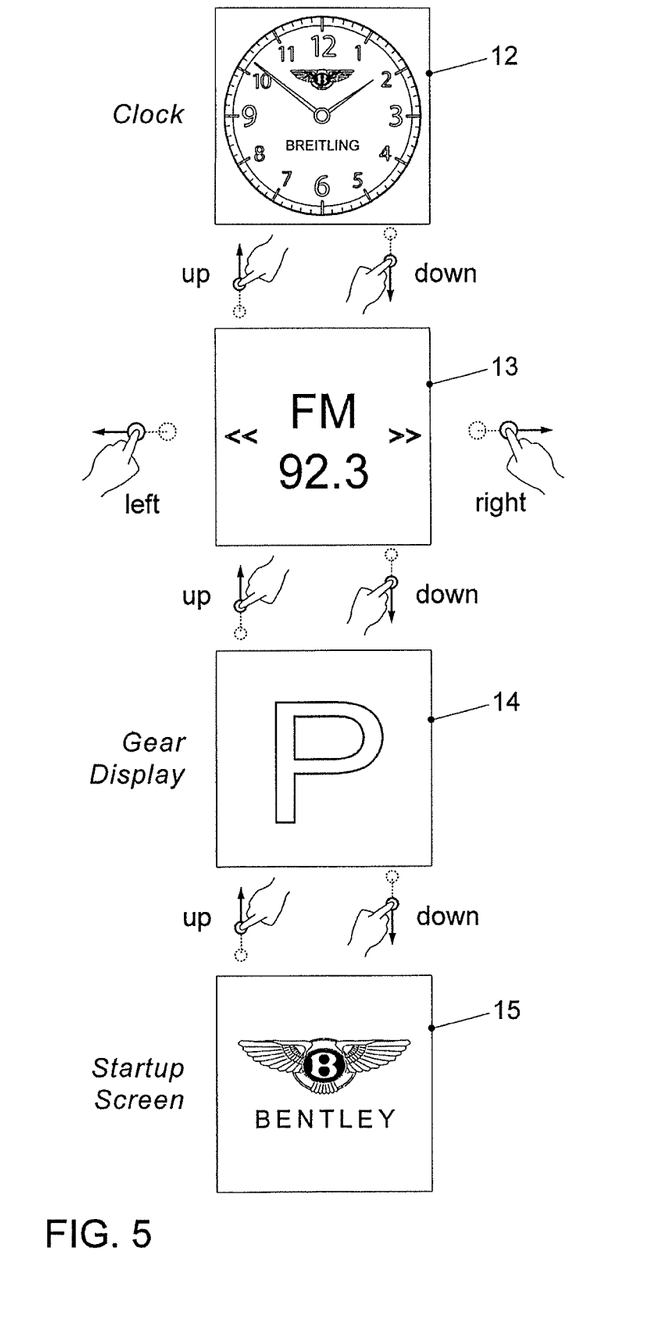
FIG. 5 shows outputs of a display of a gearshift knob according to a disclosed embodiment.

FIG. 4 shows an interaction between a thumb 11 and the touchscreen 5. The touch-sensitive surface 9 of the touchscreen 5 may detect sweeping movements, so-called swipe gestures, of the thumb 11 and upon the detection of the thumb movement the context of the currently displayed information on the display 8 of the touchscreen 5 may be changed. Simple gestures like up, down, left and right may be used to change between different infotainment modes. Exemplary infotainment modes in the context of the display 8 are shown in connection with FIG. 5. By performing up and down movements on the touch-sensitive surface 9 the display 8 may display a clock 12, a currently selected broadcast station 13, a currently selected gear 14 of a transmission of the vehicle, or a start-up screen 15. When the display of the currently selected broadcast station 13 is shown on the display 8, the station may be changed by performing a movement to the left or to the right. Further possible infotainment modes in the context of the display 8 may be for example a playlist of a multimedia or infotainment system of the vehicle, a volume control of an amplifier of the vehicle, a driving mode like a sport mode or an eco mode, or a display of contacts of a phonebook of a telephone. Furthermore, the touch-sensitive surface 9 may be coupled to a navigation system of the vehicle and an operation of the navigation system may be utilized by detecting touches of a user touching the touch-sensitive surface 9.

The haptic feedback device 10 may be used to confirm inputs made by the user via the touch-sensitive surface 9. For example, the haptic feedback device 10 may be utilized to provide a haptic feedback to the user when the user is touching the touchscreen 5 to mock a button press. Furthermore, the haptic feedback device 10 may be used for optimal shift point indication. The optimal shift point between the gears in a vehicle transmission has a big impact on the overall fuel consumption. In order to provide the driver with a hint as when to change to the next gear, the haptic feedback device 10 in the gearshift knob 4 may provide a vibrational feedback. This haptic feedback may be intensified when the optimal shifting point is approaching. Several feedback modes may be possible. For example, in an eco-mode, the haptic feedback device 10 is tuned to vibrate when the engine reaches the optimal shifting point for fuel economy. In a sport-mode the haptic feedback device 10 may be tuned to vibrate when the engine reaches the point of maximum torque. The necessary information about an optimal shifting point is provided through the vehicle's internal communication bus and may be calculated by a vehicle control unit.

The display 8 may comprise a full-colour display and a backlight for illuminating the display. Thus, the display 8 may contribute to a lighting of the interior of the vehicle. The colour scheme may be adjusted to the car's interior or brand colours of the manufacturer. The display may show vehicle-specific logos or start-up animations. Furthermore, different colours displayed on the display 8 may indicate various modes of the transmission, for example grey for a neutral (N) position, blue for a drive (D) position, and red for a sport-mode (S). Furthermore, in manual transmission cars a traditional gear map indicating the positions where to move the gear selector for reaching the different gears may be displayed on the display 8.

Figure 6:
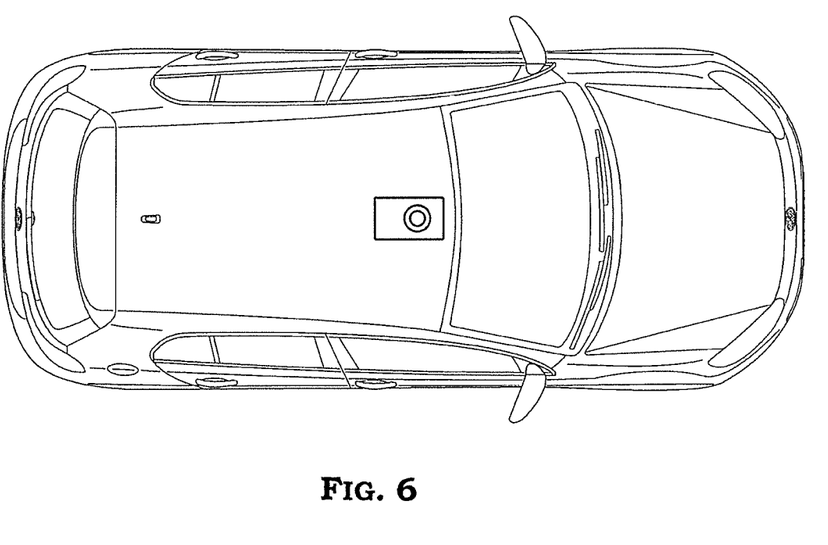
FIG. 6 shows schematically a vehicle comprising a gearshift knob according to a disclosed embodiment.

FIG. 6 shows a vehicle 16 comprising a gear selector 1. The gear selector 1 comprises a base 2, a (not shown) gearshift lever between the base 2 and a gearshift knob 4, and a touchscreen 5 at an upper side of the gearshift knob 4. The gear selector 1 may be arranged between the two front seats of the vehicle 16 or may be arranged in a dashboard of the vehicle 16. Furthermore, the gear selector may be arranged at a steering column of the vehicle 16.

While exemplary embodiments have been described above, various modifications may be implemented in other embodiments. For example, the display 8 may display a currently selected gear of an automatic or manual transmission, or a user-defined information, for example an information about the vehicle.

Finally, it is to be understood that all the disclosed embodiments described above are considered to be comprised by the present invention as it is defined by the appended claims.

What is claimed is:

1. A gearshift knob for a gearshift lever of a manual transmission vehicle, the gearshift knob comprising:
   a display configured to display visual information; and
   a touch sensitive surface configured to detect a touch of a user touching the touch sensitive surface;
   a haptic feedback device configured to output haptic feedback to the user via the gearshift knob,
   wherein, the gearshift knob is configured to be operated by the user to shift between gears of the manual transmission vehicle,
   wherein, the gearshift knob is ergonomically adapted such that, when a user's hand is wrapped around the gearshift knob, the touch sensitive surface is positioned perpendicular to a longitudinal axis of gearshift lever and above the wrapped hand to be operated by the hand's corresponding thumb of while the hand is wrapped;
   wherein, the gearshift knob outputs optimal operational feedback as part of the haptic feedback output to the user,
   wherein the optimal operational feedback includes an optimal shift point indication that indicates an optimal shift point at which the user should shift between gears in the manual transmission of the vehicle using the gearshift lever;

wherein the optimal operational feedback comprises:
a mode wherein the haptic feedback device is tuned to vibrate when the engine reaches the optimal shifting point for fuel economy; and
a mode wherein the haptic feedback device is tuned to vibrate when the engine reaches the point of maximum torque; and
wherein the touch-sensitive surface detects swipe gestures of a user's digit and, an electronic control unit controls displayed information on the display in response to detection of a swipe gesture.

2. The gearshift knob according to claim 1, wherein the display is arranged at an upper side of the gearshift knob.

3. The gearshift knob according to claim 1, wherein the touch sensitive surface is comprised in a display surface of the display.

4. A vehicle comprising a gearshift lever with a gearshift knob for shifting between gears of a manual transmission vehicle, the gearshift knob comprising:
a display configured to display visual information; and
a touch sensitive surface configured to detect a touch of a user touching the touch sensitive surface;
a haptic feedback device configured to output haptic feedback to the user via the gearshift knob,
wherein, the gearshift knob is configured to be operated by the user to shift between gears of the manual transmission vehicle,
wherein, the gearshift knob is ergonomically adapted such that when a user's hand is wrapped around the gearshift knob, the touch sensitive surface is positioned perpendicular to a longitudinal axis of gearshift lever and above the wrapped hand to be operated by the hand's corresponding thumb while the hand is wrapped;
wherein, the gearshift knob outputs optimal operational feedback as part of the haptic feedback output to the user, and
wherein the optimal operational feedback includes an optimal shift point indication that indicates an optimal shift point at which the user should shift between gears in manual transmission of the vehicle using the gearshift lever;
wherein the optimal operational feedback comprises:
a mode wherein the haptic feedback device is tuned to vibrate when the engine reaches the optimal shifting point for fuel economy; and
a mode wherein the haptic feedback device is tuned to vibrate when the engine reaches the point of maximum torque; and
wherein the touch sensitive surface detects swipe gestures of a user's digit and, an electronic control unit controls displayed information on the display in response to detection of a swipe gesture.

5. A method for operating a manual transmission vehicle, wherein the vehicle comprises a gearshift lever with a gearshift knob, wherein the gearshift knob comprises a display configured to display visual information, a touch sensitive surface configured to detect a touch of a user touching the touch sensitive surface, and a haptic feedback device configured to output a haptic feedback to the user via the gearshift knob, wherein the method comprises:
displaying information of the vehicle on the display;
operating the touch-sensitive surface in response to an input with a user's thumb while the user is ergonomically gripping the gearshift in the user's corresponding hand, wherein the touch-sensitive surface is perpendicular to a longitudinal axis of gearshift lever and operated with the user's thumb above the remainder of the user's corresponding hand gripping the gearshift,
determining a currently selected gear,
determining an appropriate gear in the manual transmission in response to a current driving condition of the vehicle, and
outputting optimal operational feedback as part of a haptic feedback output to the user,
wherein the optimal operational feedback includes an optimal shift point indication that indicates an optimal shift point at which the user should shift between gears in the manual transmission of the vehicle using the gearshift lever,
wherein the optimal operational feedback comprises:
a mode wherein the haptic feedback device is tuned to vibrate when the engine reaches the optimal shifting point for fuel economy; and
a mode wherein the haptic feedback device is tuned to vibrate when the engine reaches the point of maximum torque,
wherein the touch sensitive surface detects swipe gestures of a user's digit and, an electronic control unit controls displayed information on the display in response to detection of a swipe gesture.

6. The method according to claim 5, wherein the information comprises at least one information of a group consisting of:
a currently selected gear or mode of transmission,
a gear map,
a currently selected radio station of a radio receiver of the vehicle,
a currently played song of media playback device of the vehicle,
a current volume of an audio amplifier of the vehicle,
a contact of an electronic phonebook of a mobile telephone,
a driving mode of the vehicle,
a logo of the vehicle, and
a current time.

7. The method according to claim 5, further comprising:
detecting a gesture of a user touching the touch sensitive surface and controlling a function of the vehicle in response to the gesture and the information displayed on the display.

8. The method according to claim 7, wherein detecting the gesture comprises detecting a moving of a finger over the touch sensitive surface in a direction back, forth, left or right with respect to vehicle.

9. The method according to claim 7, wherein the function comprises at least one of a group consisting of:
selecting another information to be displayed on the display,
tuning up or down a radio receiver of the vehicle,
selecting a next or previous song of a media playback device of the vehicle,
controlling up or down a volume of an audio amplifier of the vehicle,
displaying another contact of an electronic phonebook of a mobile telephone on the display, and
changing a driving mode of the vehicle.

10. The method of claim 1, wherein the haptic feedback device is used to confirm inputs made by the user via the touch sensitive surface.

11. The method of claim 1, wherein the vibrational feedback intensifies when the optimal shifting point is approaching.

12. The method of claim 4, wherein the haptic feedback device is used to confirm inputs made by the user via the touch sensitive surface.

13. The method of claim 4, wherein the vibrational feedback intensifies when the optimal shifting point is approaching.

14. The gearshift knob of claim 1, wherein visual information output by the display is visible through the touch-sensitive surface to a user looking from an upper side at the touch-sensitive surface.

15. The gearshift knob of claim 1, wherein the haptic feedback device includes an electric motor with an out-of-balance weight attached at the rotor of the motor.

16. The gearshift knob of claim 1, wherein haptic feedback is intensified as the transmission approaches the optimal shifting point.

* * * * *